US008051172B2

(12) United States Patent
Sampson

(10) Patent No.: US 8,051,172 B2
(45) Date of Patent: Nov. 1, 2011

(54) METHODS FOR MANAGING THE EXCHANGE OF COMMUNICATION TOKENS

(76) Inventor: Scott E. Sampson, Orem, UT (US)

( * ) Notice: Subject to any disclaimer, the term of this patent is extended or adjusted under 35 U.S.C. 154(b) by 1584 days.

(21) Appl. No.: 11/230,747

(22) Filed: Sep. 20, 2005

(65) Prior Publication Data

US 2006/0015566 A1    Jan. 19, 2006

Related U.S. Application Data

(63) Continuation-in-part of application No. 10/382,042, filed on Mar. 5, 2003, now Pat. No. 7,010,565, and a continuation-in-part of application No. 10/961,591, filed on Oct. 8, 2004, now Pat. No. 7,233,961, which is a continuation of application No. 10/443,293, filed on May 22, 2003, now Pat. No. 6,804,687.

(60) Provisional application No. 60/611,848, filed on Sep. 21, 2004, provisional application No. 60/415,321, filed on Sep. 30, 2002.

(51) Int. Cl.
*G06F 15/16* (2006.01)

(52) U.S. Cl. ............... 709/226; 709/246; 726/9; 725/40

(58) Field of Classification Search .................. 709/202, 709/246, 226; 726/9; 715/40
See application file for complete search history.

(56) References Cited

U.S. PATENT DOCUMENTS

| 4,931,933 | A | 6/1990 | Chen et al. ..................... 364/409 |
| 5,063,253 | A | 11/1991 | Gansen et al. |
| 5,063,523 | A | 11/1991 | Vrenjak ......................... 364/514 |
| 5,377,354 | A | 12/1994 | Scannell et al. .............. 395/650 |
| 5,499,358 | A | 3/1996 | Nevarez ......................... 395/600 |
| 5,619,648 | A | 4/1997 | Canale et al. ............. 395/200.01 |
| 5,628,007 | A | 5/1997 | Nevarez ......................... 395/612 |
| 5,724,567 | A | 3/1998 | Rose et al. ..................... 395/602 |
| 5,765,033 | A | 6/1998 | Miloslavsky ................. 395/602 |

(Continued)

FOREIGN PATENT DOCUMENTS

GB    2343529  A    10/2000

(Continued)

OTHER PUBLICATIONS

Padwick et al. "Special Edition Using Microsoft Outlook 2000", Que Publisher, May 12, 1999, p. 1488.

(Continued)

*Primary Examiner* — Tammy T Nguyen
(74) *Attorney, Agent, or Firm* — Kory D. Christensen; Stoel Rives LLP

(57) ABSTRACT

A communication system issues tokens in order to control communication received by the system. The tokens are arbitrary symbols which are stored in one or more Token Logs (TLs) for future reference. Those to whom the tokens are issued use specific tokens by including them in messages sent to the token issuer. The communication systems belonging to the potential token users record tokens which they have been issued, so that those tokens may be included in subsequent communication to the token issuers. Incoming messages without tokens are given a tokenless status and possibly rejected. Token-request tokens are automatically issued to allow other individuals to request tokens which can be used in subsequent communication. Multiple Token Logs are synchronized across multiple devices. Functional and informational message address headers are employed when sending messages so that tokens issued to a given user are not divulged to other message recipients who are different from the given user and different from the token issuer.

36 Claims, 9 Drawing Sheets

U.S. PATENT DOCUMENTS

| | | | |
|---|---|---|---|
| 5,765,178 A | 6/1998 | Tanaka | 707/526 |
| 5,802,253 A | 9/1998 | Gross et al. | 395/51 |
| 5,845,082 A * | 12/1998 | Murakami | 709/226 |
| 5,883,810 A | 3/1999 | Franklin et al. | |
| 5,905,863 A | 5/1999 | Knowles et al. | 395/200.36 |
| 5,930,471 A | 7/1999 | Milewski et al. | 395/200.04 |
| 5,937,161 A | 8/1999 | Mulligan et al. | 395/200.36 |
| 5,958,005 A | 9/1999 | Thorne et al. | |
| 5,970,457 A | 10/1999 | Brant et al. | |
| 5,999,932 A | 12/1999 | Paul | 707/10 |
| 5,999,967 A | 12/1999 | Sundsted | |
| 6,023,723 A | 2/2000 | McCormick et al. | 709/206 |
| 6,025,709 A | 2/2000 | Bradley | 324/158.1 |
| 6,032,216 A | 2/2000 | Schmuck et al. | |
| 6,075,863 A | 6/2000 | Krishnan et al. | 380/49 |
| 6,088,720 A | 7/2000 | Berkowitz et al. | |
| 6,112,227 A | 8/2000 | Heiner | 709/203 |
| 6,122,631 A | 9/2000 | Berbec et al. | |
| 6,167,435 A | 12/2000 | Druckenmiller et al. | |
| 6,199,102 B1 | 3/2001 | Cobb | 709/206 |
| 6,205,435 B1 | 3/2001 | Biffar | |
| 6,236,768 B1 | 5/2001 | Rhodes et al. | 382/306 |
| 6,249,807 B1 | 6/2001 | Shaw et al. | 709/206 |
| 6,301,608 B1 | 10/2001 | Rochkind | 709/206 |
| 6,321,267 B1 | 11/2001 | Donaldson | 709/229 |
| 6,324,569 B1 | 11/2001 | Ogilvie et al. | |
| 6,397,261 B1 | 5/2002 | Eldridge et al. | 709/299 |
| 6,415,275 B1 | 7/2002 | Zahn | 706/47 |
| 6,453,327 B1 | 9/2002 | Nielsen | 707/500 |
| 6,484,197 B1 | 11/2002 | Donohue | |
| 6,505,300 B2 | 1/2003 | Chan et al. | 713/164 |
| 6,549,950 B2 | 4/2003 | Lytle et al. | |
| 6,618,716 B1 | 9/2003 | Horvitz | |
| 6,725,228 B1 | 4/2004 | Clark et al. | |
| 6,804,687 B2 | 10/2004 | Sampson | |
| 7,240,365 B2 * | 7/2007 | de Jong et al. | 726/9 |
| 2001/0014878 A1 | 8/2001 | Mitra et al. | |
| 2001/0025271 A1 | 9/2001 | Allen | |
| 2001/0034835 A1 | 10/2001 | Smith | |
| 2002/0049661 A1 | 4/2002 | Otero et al. | |
| 2002/0049961 A1 | 4/2002 | Fang et al. | 717/127 |
| 2002/0059454 A1 | 5/2002 | Barrett et al. | 709/245 |
| 2002/0087641 A1 | 7/2002 | Levosky | 709/206 |
| 2002/0099665 A1 | 7/2002 | Burger et al. | 705/67 |
| 2002/0107925 A1 | 8/2002 | Goldschneider et al. | 709/206 |
| 2002/0116463 A1 | 8/2002 | Hart | 709/206 |
| 2002/0120581 A1 | 8/2002 | Schiavone et al. | 705/64 |
| 2002/0120600 A1 | 8/2002 | Schiavone et al. | 707/1 |
| 2002/0120702 A1 | 8/2002 | Schiavone et al. | 709/207 |
| 2002/0128033 A1 | 9/2002 | Burgess | 455/528 |
| 2002/0129111 A1 | 9/2002 | Cooper | 709/207 |
| 2002/0133469 A1 | 9/2002 | Patton | 705/75 |
| 2002/0174010 A1 | 11/2002 | Rice, III | |
| 2002/0174185 A1 | 11/2002 | Rawat et al. | 709/206 |
| 2002/0178381 A1 | 11/2002 | Lee et al. | 713/201 |
| 2002/0181703 A1 | 12/2002 | Logan et al. | 380/30 |
| 2002/0184344 A1 | 12/2002 | Elvanoglu et al. | 709/219 |
| 2002/0198945 A1 | 12/2002 | Thomas | 709/206 |
| 2002/0199095 A1 | 12/2002 | Bandini et al. | 713/151 |
| 2003/0009385 A1 | 1/2003 | Tucciarone et al. | 705/26 |
| 2003/0009698 A1 | 1/2003 | Lindeman et al. | 713/201 |
| 2003/0182332 A1 | 9/2003 | McBrearty et al. | |
| 2005/0267994 A1 * | 12/2005 | Wong et al. | 709/246 |
| 2007/0277201 A1 * | 11/2007 | Wong et al. | 725/40 |

FOREIGN PATENT DOCUMENTS

| | | |
|---|---|---|
| WO | 9629667 A1 | 9/1996 |
| WO | 9822915 A1 | 5/1998 |
| WO | 9927475 A1 | 6/1999 |
| WO | 0154085 A2 | 7/2001 |
| WO | 0167355 A2 | 9/2001 |
| WO | 0180011 A1 | 10/2001 |
| WO | WO 01/80011 | 10/2001 |
| WO | 184509 A2 | 11/2001 |
| WO | 0205226 A2 | 1/2002 |

OTHER PUBLICATIONS

Attoh-Okin, N. O., et al, "Security Issues of Emerging Smart Cards Fare Collection Application in Mass Transit," Lehman Center for Transportation Research, Dept. of Civil Engineering, 1995 IEEE.

* cited by examiner

METHODS FOR MANAGING THE EXCHANGE OF COMMUNICATION TOKENS

RELATED APPLICATIONS

This application is a continuation-in-part of U.S. patent application Ser. No. 10/382,042, filed Mar. 5, 2003, now U.S. Pat. No. 7,010,565 for "Communication Management Using a Token Action Log," which claims the benefit of U.S. Provisional Application No. 60/415,321, filed Sep. 30, 2002, for "Function and Use of a Token Action Log." This application is also a continuation-in-part of U.S. patent application Ser. No. 10/961,591, filed Oct. 8, 2004, now U.S. Pat. No. 7,233,961 for "Managing a Message Communication and File System," which is a continuation of U.S. patent application Ser. No. 10/443,293, filed May 22, 2003, for "File System Management with User-Definable Functional Attributes Stored in a Token Action Log," now U.S. Pat. No. 6,804,687. This application is also related to and claims the benefit of U.S. Provisional Application No. 60/611,848, filed Sep. 21, 2004, for "Methods for Managing the Exchange of Communication Tokens." All of the foregoing applications are specifically incorporated herein by reference.

COPYRIGHT NOTICE

© 2004 Scott E. Sampson. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present invention relates generally to communication systems. More specifically, the present invention relates to systems and methods for exchanging communication tokens, which tokens enable and control communication between parties.

BACKGROUND OF THE INVENTION

In a communication system, individual A may desire to grant individual B the right to send messages to individual A. Individual B might likewise desire to give individual A rights to send messages to individual B. When these messages are received, it may be further desirable that the messages be processed according to a set of predefined actions, which predefined actions may, under various embodiments, be specific to the given sender, the given message, and/or the given message type.

A scheme for managing such message control is outlined in application Ser. No. 10/382,042 entitled "Communication Management Using a Token Action Log," which was subsequently expanded in co-pending application Ser. No. 10/443,293 entitled "File System Management with User-Definable Functional Attributes Stored in a Token Action Log," now U.S. Pat. No. 6,804,687. This document extends these prior two by providing methods for efficiently exchanging Tokens between individuals, organizations, and/or other entities.

Those prior applications describe a system in which, in one embodiment, entity A has a message device that contains a Token Action Log (TAL). The TAL is a data structure in which tokens are recorded along with corresponding actions that are to occur in conjunction with specific system events involving specific tokens. Tokens are defined as arbitrary or systematic symbols that have meaning according to specifications recorded in the TAL.

For example, a random-symbol token "142etn" might be created by the communication device belonging to individual A. The TAL entry for that token (stored in individual A's communication device) might indicate that when a message is received containing that token, the message is to be displayed in a bold-green font and flagged as "important." Individual A may issue that token to individual B, which is to say that individual A instructs his or her communication device to send the token to individual B's communication device, so that individual B may include that token in subsequent messages sent to individual A. Individual B is therefore a "user" of the token issued by individual A. Individual A is the "issuer" of the token.

The potential purposes of such token exchange are many. Token exchange can be used to avoid unsolicited messages (so-called "spam"), since incoming messages with valid tokens might be accepted and arriving messages without a valid token might be challenged and/or rejected. The token exchange might assist the token issuer in classifying and/or organizing incoming communication—TAL entries can specify the nature of communication coming from users of the given token. Further, token users might be given the opportunity to indicate the nature of incoming messages, by selecting different issued tokens for different purposes, or by annotating tokens with specific purposes.

DETAILED DESCRIPTION

Figure 1:
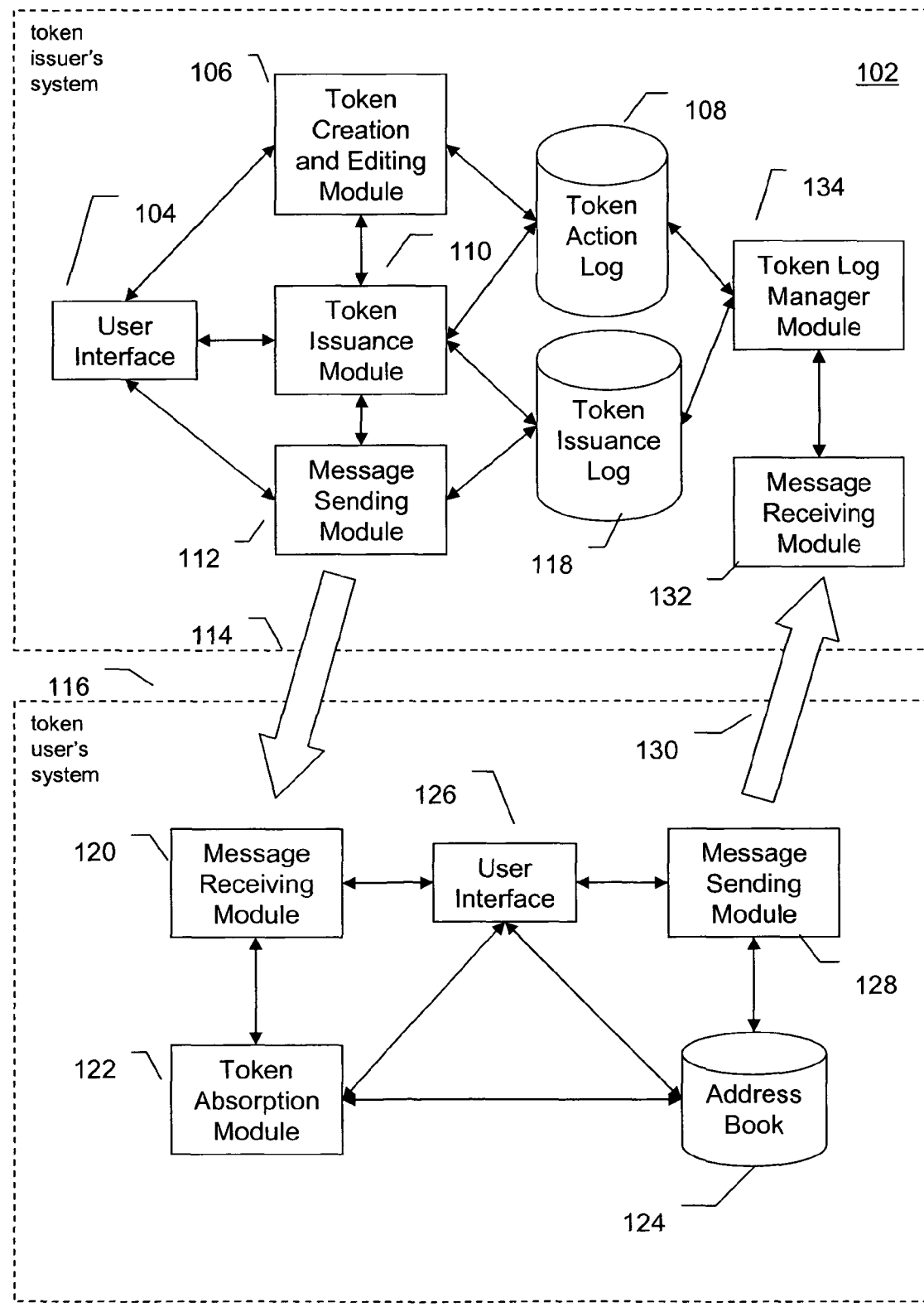
FIG. 1 is a block diagram of components of a system in accordance with an embodiment of the invention.

The present patent application describes systems and methods for facilitating the exchange of tokens between entities, including identifying the token status of incoming messages, challenging messages without tokens, issuing tokens as necessary, receiving issued tokens, tracking the issuance of tokens, and synchronizing the TL entries.

The operator of a communication system having a TL issues tokens to those individuals or entities he or she desires to subsequently receive communication from. Those other individuals or entities can include issued tokens with subsequent communication back to the operator issuing the tokens. The token issuer may keep track of which tokens have been issued, which is accomplished by storing them in a TL.

The most basic TL would simply keep track of tokens which are valid and which can be used in subsequent communication. However, more useful TLs associate the tokens with other useful information. Two examples are a Token Issuance Log (TIL) and a Token Action Log (TAL).

A Token Issuance Log (TIL) is a TL that associates issued tokens with the addresses of those to whom the specific tokens have been issued. Among other things, this allows for subsequent checking if a received token was sent from an address to which the token was previously issued. It also allows automatic reissue of tokens which have been previously issued, as will be discussed below.

A Token Action Log (TAL) associates specific tokens with specific actions that occur with messages that have one or more of the specific tokens attached. An example is associating each token in a TAL with a default message folder, and automatically filing incoming messages containing tokens in folders corresponding to the specific tokens. In a general sense, a TAL may contain specification(s) of action(s) that are to be performed when a message containing a given token experiences a given event.

Defining default folder(s) for message(s) containing specific token(s) renders the traditional "inbox" as an ineffective way to identify new incoming messages, such as in email contexts. Traditionally, email system users expect new incoming message(s) to appear in an "inbox" folder. But, email systems with TALs may automatically file incoming message(s) in appropriate folder(s) according to a configuration specified in a TAL. As such, new incoming messages might need to be found in folder(s) other than an "inbox" or "inboxes." The "inbox" folder might simply be a default new message folder, meaning that message(s) which are not assigned to folder(s) by token action would otherwise be assigned to an "inbox" folder. However, there are usually advantages in having messages automatically categorized as they arrive.

Using Status Indicators to Track Messages.

In a TAL system, the status of any message does not need to be implied by the folder in which the message resides, but rather can be noted by a status indicator which is distinct from the message folder to which the message is assigned. The status can be automatically set by the system according to token condition of the message.

Incoming messages containing a valid token might be given the status of "new" or "newmail" meaning new mail to be reviewed by the message recipient. The given message will have that "new" status flag until either the system operator initiates a change in the message status or until a token action specified in the TAL is performed with the function of changing the status.

Messages arriving without a valid token can be flagged with a "tokenless" status and automatically processed so as to limit the receipt of undesirable messages. Tokenless messages from a "whitelist" such as an address book can be automatically received as acceptable tokenless email. Messages from a "blacklist" can be automatically rejected (i.e., given a status of "rejected" and/or deleted). Other tokenless messages might be rejected as questionable, but first an automatic reply can be returned to the sender to a) require the sender to verify that he or she is not sending undesirable messages, and b) provide information about how to request a token that can be used in subsequent communication.

Using Token-Request Tokens for Sender Verification.

A common method for verifying the desirability of questionable incoming messages called "challenge-response" involves the system challenging the sender to answer a question that a human could answer relatively easily but a message-sending robot cannot answer easily. The problem is that message-sending robots might become more sophisticated in answering questions, and can counter that type of challenge-response.

One alternate and improved method described herein for verifying the desirability of questionable incoming messages is to create a "token-request token" that is automatically sent back to the questionable message sender. That token-request token is sent with a message explaining that the questionable message sender needs to return the given token-request token to the same recipient who is named but whose communication address (e.g., email address, instant messenger address, etc.) is not identified in the return message. A human being would likely know the email address for that person's name, having just sent an email to that person. However, a message-sending robot would not likely be able to match the email address to that name, and would thus be unable to easily return the token-request token.

When the message system receives a message with a valid token-request token, the system can automatically change the status of the message to "request" which means a request for a token. The system could also invalidate or delete the token-request token so that it cannot subsequently be used (if single use is desired). The system operator can then either issue a token to the sender, or ignore the request for a communication token.

Preventing Auto-Reply Recursion.

In one embodiment, care is taken when sending this or any automatic replies to messages, since if the automatic reply is automatically returned (or "bounced") by the recipient system, it could set off a chain reaction of two systems repeatedly sending automatic replies to each other's automatic replies. A solution to this problem is to automatically include with any automatic reply message a token or flag that indicates that it is an automatic reply, so that if the automatic reply message "bounces" back from the recipient, an additional automatic reply can be suppressed. For example, in email automatic replies a null-token (i.e. a token that is nothing) can be included in an email address extension by the character combination "+@" which, if detected in the "to:" address of an incoming message will suppress any automatic replies.

Generality of Status Indicators.

The above descriptions of specific status values are meant to be conceptual, but not limiting in the use of a word or phrase. For example, the term "tokenless" could be "token free," "blank token," "no token," or any other phrase with similar conceptual meaning.

The message "status" can thus be an effective means of categorizing incoming messages according to their value within the communication system. In addition to automatic statuses (e.g. "new mail," "tokenless," "request," or "rejected"), other statuses can be set by the system operator or by token actions. Work-in-progress messages can be given a status of "to do," "pending," "calendar item," etc. Old messages can be given status of "old mail" (no longer needing attention), "saved" (protected from trash), or "trash" (marked for deletion).

Transferring Messages.

Another useful way to change the status of a message is to change the communication system account in which the message arrives. Traditional communication systems often have a function for "forwarding" a message to another recipient.

Forwarding messages typically means sending a copy of the message, which results in duplicate messages. With multi-user communication systems, an alternative is to "transfer" the message to another message account, which is accomplished simply by flagging the transferred message as belonging to the other account. The message could be transferred back to the original account in similar manner.

A useful application of this transfer function in dealing with incoming messages is in allowing a third-party (other than the original message sender and recipient) to review incoming messages accompanied by certain tokens or accompanied by the "tokenless" token (i.e. no token). For example, a person might give an administrative assistant the responsibility of reviewing all tokenless email that is not from an address in his or her whitelist. As such, the "tokenless" actions would include an action to automatically transfer any such incoming messages to the administrative assistant's communication account for review. The administrative assistant can then decide whether or not a token should be issued to the message sender. This approach facilitates delegation of message processing.

Another useful application of the message transfer function is a communication system operator having multiple base addresses or system accounts, possibly with different communication purposes. Incoming messages to one account could be automatically transferred to an appropriate other account as dictated by actions corresponding to an attached token (as specified in a TAL). The communication system operator could switch views from one account to another account to see the various messages. For example, email system operator John Doe may have "jdoe_work@isp.domain" for work communication and "jdoe_pers@isp.domain" for personal communication. John may be logged in to view his "jdoe_work" account messages or his "jdoe_pers" account messages. An incoming message arriving at his "jdoe_pers" account may include a token with a TAL action that automatically transfers the message to his "jdoe_work" account. John can view that message by switching his login view to his "jdoe_work" account. (In testing the system, the inventor has found this feature to be extremely useful in segmenting incoming messages.)

Relation Between TAL and TIL.

The TAL and the TIL are two examples of a Token Log (TL). Note that it is conceivable that the TAL and the TIL might be one and the same data file. Or, the TIL might be embedded in the TAL. However, in a preferred embodiment, they are separate but related files (or database tables), wherein the TAL typically contains one main entry for each token that has been defined and perhaps multiple entries for each specified action. The TIL file typically contains an entry for every specific token being issued to a specific individual or entity address. Also, it is conceivable that a token can be created in the TAL but not yet issued. It is also conceivable that a token might be issued but not yet defined in the TAL, but such may potentially violate data structure referential integrity.

Another common situation where a token is created in a TAL without being noted in the TIL is where a so-called "class token" is created and distributed through manual (i.e. not system-automatic) means. (A "Class token" is a token that is issued to a class or group of individuals, where an "individual" could be a person or another communicating entity. For a description of "class tokens" see the inventor's prior patents.) For example, a token issuer may create a token that is included in his or her email address as published on his or her business cards. Anyone who receives a business card may use that token to send an email message to the token issuer. The issuer may not know in advance who will wind up with a copy of his or her business card, and thus be unable to record those individuals in the TIL a priori. In some embodiments it may be beneficial for the system operator to manually create an entry in the TIL for manually distributed class tokens, with an informational note about how the token is or was issued by manual means. If one or more token(s) are manually distributed to individuals or entities of known communication address(es), then it certainly would make sense to manually record those token(s) together with the corresponding address(es) in the TIL.

Another situation where a token is manually created in a TL is where the token issuer finds it necessary to provide his or her address to some other entity, such as on a website information form. For example, a token issuer may make an online purchase and need to enter his or her email address so that the online merchant can email a receipt. The token issuer could create a token and store it in a TL, then manually enter the token with his or her email address at the merchant website. The token issuer may optionally record in the TL or in a TIL information about the website to which the token was manually issued, thus allowing him or her to later recall where a user of the token likely received the token. For example, if undesirable email starts arriving with that token, the token issuer would have reason to believe that the online merchant provided that token to the sender of the undesirable email.

Reciprocating Class Tokens.

The idea of class tokens is extremely useful, since they can simplify the issuance of tokens to groups of individuals. However, a potential shortcoming of class tokens is that they allow the class of individuals to communicate with the class token issuer, but may not allow the class token issuer to communicate with the class of individuals (unless each of those individuals issues a token back to the class token issuer). A class token issuer may designate a class token as a "reciprocating class token," which means that the class token issuer expects that the class individuals will correspondingly accept messages having the class token.

An example of using a reciprocating class token is a course instructor creating a class token (in a TL) and including the class token on the course syllabus. In this way, students in the class can send messages to the instructor (by including the class token). If the instructor designates the class token as a reciprocating class token, then the students should each record the class token in their individual TLs, thus allowing the instructor (or any other student in the course) to send messages to the students.

Recognizing Multiple Addresses of Issuance.

In some cases, a messaging system operator may have an address book that contains multiple addresses for a given other individual. The messaging system operator may issue a token to that other individual and may send the issued token to one of the known addresses. As such, that token and the other individual's address might be stored together in a TIL. However, the messaging system operator may want the issued token to be considered issued from any addresses for the given other individual. One method to accomplish this is to store all of the other individuals known addresses with the token in the TIL. A problem with that approach is that if a new address for that other individual becomes known and stored in the address book, it would not be automatically associated with the issued token in the TIL.

A superior method for issuing tokens to others with multiple addresses is to relate TIL entries with corresponding address book entries. If this option is selected, then any token issued to one or more addresses for a given individual would be considered issued to all addresses for the given individual, including any new addresses for the given individual which are not known until after the time that the token was originally stored in the TIL.

Storing Foreign Tokens in Address Book.

Those to whom tokens have been issued should also keep track of tokens that they have been issued. We call tokens issued to us by others "foreign tokens." A place to keep track of foreign tokens might generically be an "address book." The address book is traditionally a place to store the addresses of others with which one may want to communicate. Communication to systems with TLs generally requires sending tokens previously recorded in those TLs. Therefore, it behooves those who are issued tokens to associate the issued tokens with the given address or token issuer in an address book. The detailed description describes a method to accomplish this purpose.

When a message is sent back to a recipient, one or more of the tokens issued by that recipient might be included. Further, one or more tokens issued to that recipient might be included with or in the sender's address, to help assure that any replies to the sent message automatically include the issued token. In this sense, the issued token is "reissued" with subsequent messages.

Note that not all foreign tokens need to be stored in an "address book" in order for them to be used (i.e. returned to the token issuer with a message). Simply replying to a message containing a foreign token (i.e. a token issued by the original message sender) can automatically include that foreign token in the reply. This is particularly true when issued (or reissued) tokens are imbedded in the "from" or "reply-to" address of messages, since a reply to such a message will go to the "from" or "reply-to" address of the message and thus include the imbedded token.

For example, an instructor issues a class token to 360 students in a class. Some of the students will use that class token to send messages to the instructor, but most will not. The instructor recognizes that it is unlikely that any students will need to communicate with the instructor after the course is over. Therefore, if a student sends a message with a student-issued token to the instructor, the instructor may not want to put that student (and the student-issued foreign token) in the instructor's address book. Instead, the instructor can simply reply to the student, with the foreign token being automatically carried over to the reply from the student's original message. The instructor can use the student's message as the basis for sending any messages to that student (until the student's message is deleted).

Informational Address Headers.

A problem can arise when a message is sent to multiple recipients, each of whom may have previously issued tokens to the sender, and each of whom may have been previously issued tokens. Traditional message addressing schemes may inadvertently divulge the token pertaining to specific recipients to other recipients. Those other recipients could possibly "spoof" by sending a message pretending to be from the individual or entity to whom a given token was originally issued, including that given token with a faked "from" address.

It generally would be preferable to keep the token(s) pertaining to each specific recipient private, and not divulge them to other recipient(s). In this way message "spoofing" can be avoided. "Spoofing" is where one individual or entity poses as another individual or entity in sending a message. Even if a sender can fake the "from" address on a sent message, that spoofing sender would be unable to fake a valid token issued to the faked "from" address if the spoofing sender has never seen any token(s) which had been issued to the faked address by the message recipient(s). The message recipient(s) could thus detect the spoofed message because it would not have a valid token.

Therefore, a method for not divulging tokens to third parties is provided which involves "functional address headers" and "informational address headers." The "functional address headers" are those components of the message that actually influence the routing of the message and where the message should be sent. Although this invention is not limited to email systems, email examples of functional headers include the standard "To:" "Cc:" and "Bcc:" entries in the message header.

The "informational address headers" are part of a message that do not influence the routing of the message, but simply provide information to the message recipient about other addresses to which the message was sent. The "informational address headers" may be formal headers such as "Also-to:" and "Also-cc:," or may simply be a notation in the body of the message about the other recipients of the message.

A way to keep tokens private in multiple-recipient messages is to send or route separate copies of the message to each of the recipients. In each copy, only the specific recipient's address is included in the functional headers, along with any tokens relevant to that specific recipient. The other recipients may be noted (without tokens) in the "informational headers"—for email systems this would include notation of other "To:" and "Cc:" recipients, but not notation of "Bcc:" recipients since "Bcc" implies blind copies that are to be kept secret from other recipients.

Securing Tokens.

In this way, the exchange of tokens only involves the message sender and the recipient(s) intended for each specific token, and the potential for "spoofing" is greatly reduced if not eliminated. There is still a risk that unscrupulous individuals may attempt to steal tokens. It would thus be good to keep the places where tokens are stored (i.e. TLs) secure, possibly requiring a password for access. Also, sent messages and the token(s) accompanying those messages might be encrypted, thus preventing "sniffers" from stealing tokens in transit. (Methods for message encryption are available from various sources.) When such precautions are used in conjunction with a TL system the integrity and security of communications can be greatly assured.

Syncing Multiple TLs.

It is conceivable that a communication system operator has multiple TLs, possibly on different communication devices. For example, a person may have a desktop computer that has email access and a cell phone that has email access. The desktop computer and the cell phone might each have TLs. It may be desirable that a token issued on one device and stored in one TL be shared across other TLs. Or, an individual or entity may have a "master TL" for recording all tokens issued by that individual or entity, even if the tokens are issued by various devices and/or are also stored on various other TL(s).

If multiple relevant TLs exist, they can be kept in sync with one another. When tokens are created, issued, and/or edited, those tokens might be automatically transferred to the other TL(s), so that messages containing those tokens can be handled by reference to those other TL(s). The method for transferring such tokens is quite straightforward—simply send the token information as part of a specifically structured message. In like manner, foreign tokens recorded in Address Book(s) can be synchronized with other relevant Address Book(s).

Shared TLs and Shared Address Books Containing Foreign Tokens.

In some environments, a group of individuals may desire to communicate with each other or with others in a consistent way. For example, employees at a company may want to be able to send messages to each other and to key suppliers and customers. Rather than exchanging tokens individually with each other, the group may establish a shared TL that is accessible only to authorized individuals from the group. When an incoming message containing token(s) is received by the communication system on behalf of an individual from the group, the system might consult both the individual's TL and the group's shared TL in determining the authenticity and/or actions corresponding to the token(s).

It is also conceivable that a group of individuals would have a shared address book, which is common for many organizations. Any individual with access to the shared address book can locate addresses for individuals listed in that address book. If that address book contains foreign tokens that were issued by individuals listed in the address book, then those accessing the address book could also have access to those foreign tokens.

Including Tokens in Distribution List Entries.

Another common way to access addresses of multiple individuals is with so-called "mailing lists" or message "distribution lists." A "distribution list manager" is a system that automatically forwards messages to individuals listed on the distribution list. Individuals on a distribution list can issue a token and include it with the address recorded on the distribution list. In this way, messages being sent via the distribution list manager will automatically include a token that indicates that the message was sent via the distribution list. By giving that issued token specific actions in a TAL, messages coming via the distribution list can be automatically processed. This is extremely useful for discussion groups and company newsletters that are sometimes useful but often just clutter the incoming message area. Such messages can be automatically filed in a separate holding location. Alternatively, some discussion groups my involve high-priority tokens for distributing urgent messages, such as from company leaders.

Some distribution list managers only allow individuals on a given distribution list to send messages through the system to all individuals on the given list. Such distribution list managers can further require the senders to include a token issued to the list, as recorded in the list entry for the given sender. As such, the distribution list acts as a TL by recording which tokens should be received from specific individuals in order to forward messages to all list members.

A benefit of these methods is that, when appropriately incorporated into communication systems, they can make the issuance of use of tokens extremely simple and in some instances almost transparent to the users.

Reference is now made to the drawings in which like reference numerals refer to like parts throughout. In the following description, well-known structures, materials, or operations are not shown or not described in detail to avoid obscuring aspects of the invention. Furthermore, the described features, structures, or characteristics may be combined in any suitable manner in one or more embodiments. Also, those skilled in the art will recognize that the invention can be practiced without one or more of the specific details, or with other methods, components, materials, etc.

While the following description uses language that is common to one type of communication system, such as an email system, those of skill in the art will recognize that the principles disclosed herein are also applicable to other types of communication systems. For example, the use of the term "address" might be taken to mean an "email address," an "instant message user name," a "phone number," and so forth. Or, the term "message" might be taken to mean an "email message," and "instant message," a "short text message," a "phone conversation," and so forth. It is intended that all types of communication systems involving addresses and messages are included within the scope of the invention.

FIG. 1 shows a block diagram of components of a system in accordance with an embodiment of the invention. The token issuer's system 102 is the communication system of the person or entity who desires to control incoming communication. For example, a token issuer may desire to receive communication from some source(s), but desires to not receive communication from other source(s). The communication system has a user interface 104 which allows the token issuer to interact and control the system.

A token creation and editing module 106 allows the user to create new tokens, assign actions to tokens, and edit previously created tokens. Created tokens can be recorded in the token action log 108, together with any actions associated with given tokens. In other cases, tokens without specific actions would simply be recorded in a token log or token issuance log.

When the user specifies that a token should be issued, the token issuance module 110 will have a new token created, or will retrieve a previously created token from the token action log 108 (at the issuer's option). The token to be issued (or reissued if it was previously issued) can be forwarded to the message sending module 112 so that the token can be sent 114 to the communication system 116 of a potential user of that token. Alternatively, the newly created token can be given to the token issuer via the user interface 104, so that the user can manually distribute the token to potential users (such as by publishing the token in some directory).

When the token is issued 110 and sent 114 to the communication system of a potential user 116, the token and the sender's address are recorded together in the token issuance log 118. Although the token issuance log 118 is shown as distinct from the token action log 108, in another embodiment the token issuance log 118 and the token action log 108 might be different parts of a relational data structure (see FIG. 2).

The potential token user's communication system receives the sent message 114 via a message receiving module 120. If it is determined that the message contains a token that was issued by the sender's system 102, then the token absorption module 122 comes in to play. The token absorption module 122 checks whether or not the issued token is already associated with the token issuer's address in an address book 124. If not, then the potential token user may be notified via the user interface 126 that an issued token has been received from the token issuer, and the user may then choose to have the token and issuers address recorded together in an address book 124. Alternatively, the potential user's system 116 might be configured for auto-absorption of tokens, meaning that the token absorption module 122 will automatically record issued tokens and issuer's address(es) together in an address book 124 without consulting the user via the user interface 126.

At some point the potential token user may desire to send a message to the token issuer. This desire is usually instigated via the user interface 126. The user specifies one or more recipients to whom the message should be sent. The message sending module 128 looks up the recipient(s) in an address book 124, and for each recipient identifies if the recipient has previously issued the user one or more tokens.

If the message sending module 128 determines that one or more tokens have been issued by a given recipient, then the message sending module 128 may prompt the user via the user interface 126 whether to include any of the previously issued token(s) with the message back to the token-issuer recipient. The token user's system may alternatively be configured to automatically send all or some subset of the tokens previously issued by a given recipient, as recorded in an address book 124, back to that recipient.

The message sending module 128 then includes whatever tokens are relevant and selected with the message that is sent 130 back to a given recipient. Note that if there are multiple recipients, each recipient may sent a copy of the message that only has token(s) relevant to the given sender, thus keeping the token(s) private and not revealed to the other message recipient(s). As an option, the addresses of the other message recipients might be included with the message to a given recipient, but without disclosing the token(s) relevant to those other recipient(s).

The message which was sent 130 is received by the token issuer's message receiving module 132. The token log manager 134 is consulted to determine if the message is accompanied by any tokens which were previously issued by the token issuer's system 102 and which were recorded in the token action log 108. As an option, the token log manager 134 might also verify that the previously issued token was received from the address of a token user's system 116 to which the token was previously issued, which would be recorded in the token issuance log 118. That would be to restrict the use of tokens to those addresses to which the tokens were previously issued, and thus prevent the token from being used from an unauthorized address. However, in many cases a given token stored in the token log 108 might be appropriately used from any address, and the token log manager 134 would not need to consult the token issuance log 118.

At some later time, the token issuer may indicate through the user interface 104 that a message should be sent to an address to which one or more tokens was previously issued. If that previous issuance is recorded in the token issuance log 118, then the message sending module 112 could present at the user interface 104 the option of selecting from the one or more previously issued token(s) to include with the outgoing message. Alternatively, the token issuer's system 102 might be configured to automatically include any tokens, all tokens, or some subset of tokens previously issued to a given message recipient with that message.

Again, if the token issuer's system 102 is sending a message to multiple recipients, each recipient could be sent a copy of the message including the selected token(s) previously issued to the given recipient, so as to keep the previously issued tokens private from the other recipient(s). And, as a matter of information to the given recipient, the addresses of the other recipient(s) might be included in the message to the given recipient, without disclosing the token(s) previously issued to those other recipient(s).

An important conceptual element of FIG. 1 is that in many or most situations a token issuer will also be, in other instances, a token user, and vise versa. This is to say that a given communication system will contain the elements of both a token issuer's system 102 and a token user's system 116. And, the message sending modules 112 and 128 might be one and the same, the message receiving modules 120 and 132 might be one and the same, and the user interfaces 104 and 126 might be one and the same. FIG. 1 simply depicts such a communication system in two parts 102 and 116 for conceptual clarity.

Figure 2:
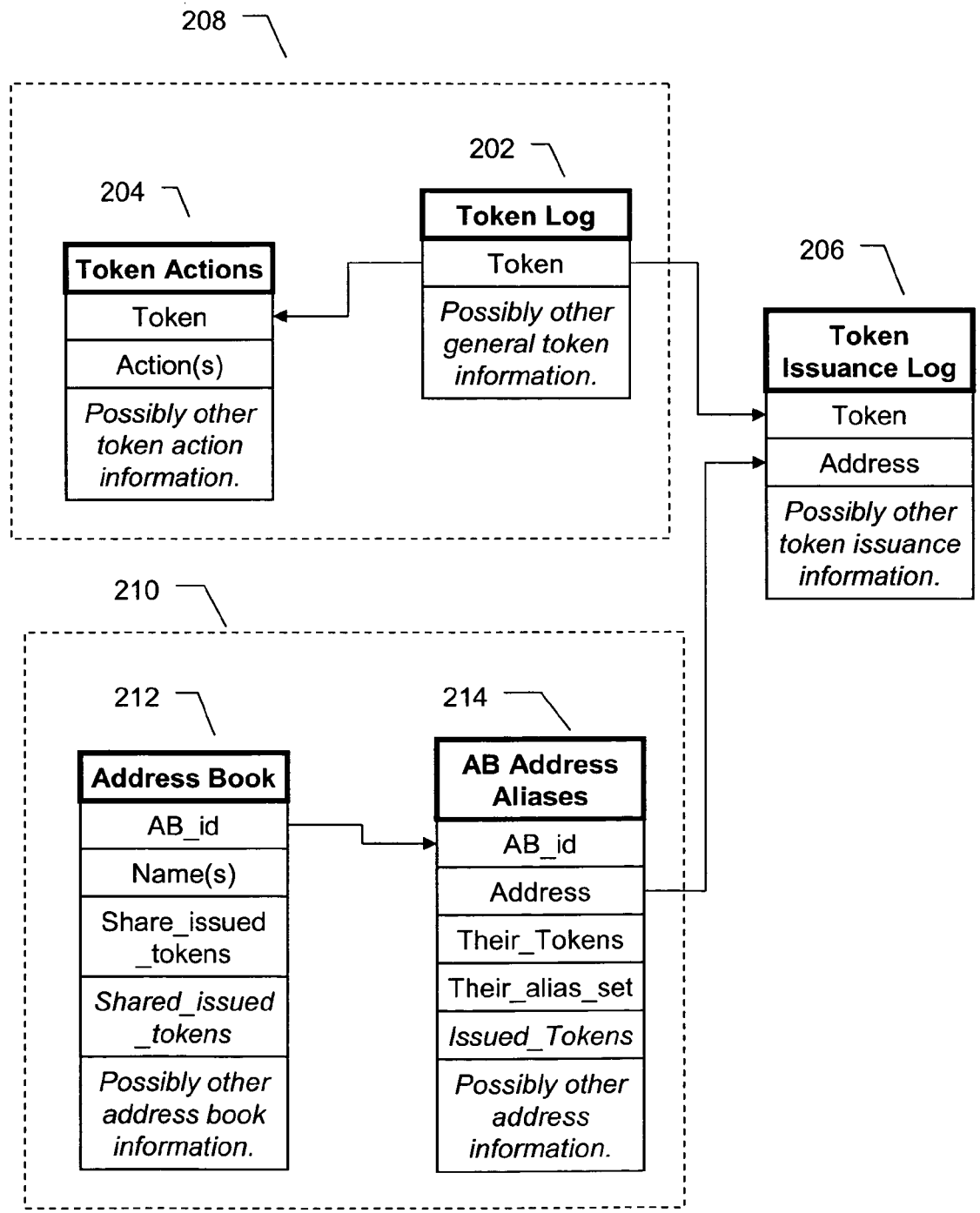
FIG. 2 is a data diagram that illustrates one embodiment of a token log (TL) and related structures.

FIG. 2 shows a data diagram that illustrates one embodiment of a token log (TL) and related structures. This simple example depicts five tables, although other tables are sure to exist in real systems. These types of tables are useful in the functionality presented in this invention.

The token file 202 might also be called the "token log," and serves the purpose of recording tokens that have been created and/or stored within the system for possible issuance and/or use. Each record in the table 202 contains a specific token, with tokens being arbitrary symbols or sets of symbols. Other information stored in the token table 202 might include the date the token was created, a tally of how many times the given token was used, the default file folder for messages received that possess that token, etc.

A related table is the token action table 204. For each token in the token table 202, the token action table may contain zero, one, or more than one records indicating action(s) associated with the given token. The single arrowhead on the line connecting the tables is intended to depict a one to many (or even one to none) relationship.

The token actions table 204 may contain other action information, such as the specific system event(s) or message event(s) that trigger the given action. For example, a given action might only need to occur at the time the message is deleted—with that event requirement being noted in a specific token action table 204 record.

The token issuance table 206 is used to record the address(es) of specific individuals or entities to whom specific tokens have been issued. For that reason, each table 206 record contains at a minimum the token being issued and the address to which it is issued. In this description the actual form of an address is unspecified. For email system the address might be an email address. For phone systems the address might be phone number(s). For instant messaging systems the address might be instant messenger user id(s). Therefore, the term "address" is used herein in the most general sense, i.e. an indication of the specific possible recipient of messages.

The token issuance table 206 might also contain information about the specific token issuance, such as the date the given token was issued, how many times the given token has been reissued, etc.

In terms of nomenclature, the first two tables 202 and 204 taken together 208 are sometimes referred to as the "Token Action Log" (TAL), or simply as a "Token Log" (TL). However, in other settings all three tables 202, 204 and 206 are referred to as a "Token Log" (TL) or as Token Logs. The Token Issuance Log 206 can be referred independently as a Token Log (TL). In actual application, the data structure referred to the "Token Log" (TL) or "Token Logs" might contain even other data tables that store information pertaining to specific tokens.

In one embodiment, tokens are also stored in an Address Book and related files 210. In this context, an "Address Book" is taken to mean any storage and association of names and address(es) of other individuals or entities. The "addresses" may be email addresses, phone numbers, instant message user identifiers (as might be stored in a "Buddy List" Address Book or elsewhere), or other identifiers of individuals or entities used in communication systems.

FIG. 2 shows an embodiment of an address book 210 that is composed of two related data tables 212 and 214, although other tables might exist in other embodiments. The main Address Book table 212 contains names of various individuals or entities, and possibly other information for each entry such as the company name, the individual's position at the company, the mailing address, etc. Those general fields of information are common in Address Books in general use.

This invention proposes that additionally the Address Book record token information, as described below.

A related table 214 in the Address Book contains actual addresses for specific individuals and entities in the main Address Book table 212. The two tables are related via a key field (represented by AB_id in this example), which uniquely identifies each entry in the main table 212. The addresses are kept in a separate related data table 214 because each individual or entity in the main table 212 may have zero or more addresses entries 214. (The arrow connecting the tables 212 and 214 is meant to depict the possible one-to-many relationship.) One of the address(es) recorded in the address table 214 for a given individual or entity may be considered the "primary" address, and additional address(es) for that individual or entity might be considered "alias(es)." It is conceivable that in another embodiment the various address(es) be kept in the main data table 212, although those familiar with the art will recognize the advantage of creating a relational structure 210.

The address table 214 contains a record for each of the one or more address(es) of a given individual or entity. In addition, each record 214 contains a list of any "foreign token(s)" ("Their_tokens") that the given individual or entity has previously issued for use by the system and/or system operator. Each record 214 may also contain an indicator ("Their_alias_set") that indicates which of those issued tokens are shared across two or more of the address entries for the given individual or entity. This is to say that tokens in a given "alias set" have meaning when returned to any of the addresses within the given "alias set." For example, in an email system there may be five email address entries in 214 for a given individual or entity, two of which entries are designated as being in set "A" and the other three of which are designated as being in set "B." Any of "Their_tokens" recorded in 214 for a set "A" address for that individual or entity are also valid for the other set "A" address for that individual or entity. (Perhaps those two set "A" addresses are simply aliases for the same communication device.) Likewise, any of "Their_tokens" recorded in 214 for a set "B" address are also valid for the other set "B" addresses (again, for the specific individual or entity).

In one embodiment, records in the address alias table 214 may also contains information about tokens ("Issued_tokens") which were issued to the given individual or entity by the communication system. Such information is actually somewhat redundant, in that the information is also stored in the token issuance table 206. However, an advantage of also storing it in the address table 214 is increased speed and simplicity of data lookup. (A disadvantage is maintaining data integrity across the two tables 206 and 214, with changes in one being appropriately reflected in the other.) Even with the redundancy it is beneficial to maintain the token issuance table(s) 206 because, among other things, some tokens might be issued to address(es) or groups which are not (or not yet) recorded in the Address book 210.

Other information that might possibly be included in address table 214 records can be whether a given address is a "primary" address for the individual or entity, the sort order with which the addresses should display in a list, the location of the system(s) that each given address addresses, whether each given address is active or inactive, and so forth.

In one embodiment, the main Address Book table 212 contains a flag "Share_issued_tokens" which indicates whether or not token(s) issued by the system to any one of the multiple addresses associated with a given Address Book 212 entry are considered as having been issued by the system to other address(es) pertaining to the given Address Book 212 entry. If this flag indicates "yes" (i.e. to share issued tokens) then any token(s) issued to one address for the given individual or entity are considered to have been issued to all addresses for that individual or entity. If this flag indicates "no" (i.e. to not share issued tokens) then tokens issued to address(es) for this individual or entity are only considered to have been issued to the specific address(es) to which they were recorded as having been issued. (Nevertheless, the system operator may request that a given token be recorded multiple times in the token issuance for different addresses belonging to a given individual or entity.)

If the "Share_issued_tokens" flag indicates "sets" then the any token(s) issued by the system to an address identified in the address table 214 as belonging to a given alias set are considered to have been issued to any and all address(es) belong to that given alias set (via "Their_alias_set") for that Address Book individual or entity. Note that in this explanation the flag values "yes," "no," and "sets" are simply descriptors, and suitable substitute flag values could alternatively be used.

In one embodiment, the main Address Book table 212 might also contain a redundant list of shared issued tokens, which are tokens that are considered as having been issued by the system to any and all addresses pertaining to the given Address Book 212 entry. That "shared_issued_tokens" information simply saves having to look up every issued token for every address of a given entry (for the cases where "share_issued_tokens" is "yes").

In the above explanation and throughout this document, the field names in the described embodiments are simply descriptors, and suitable substitute field names could be used.

Figure 3:
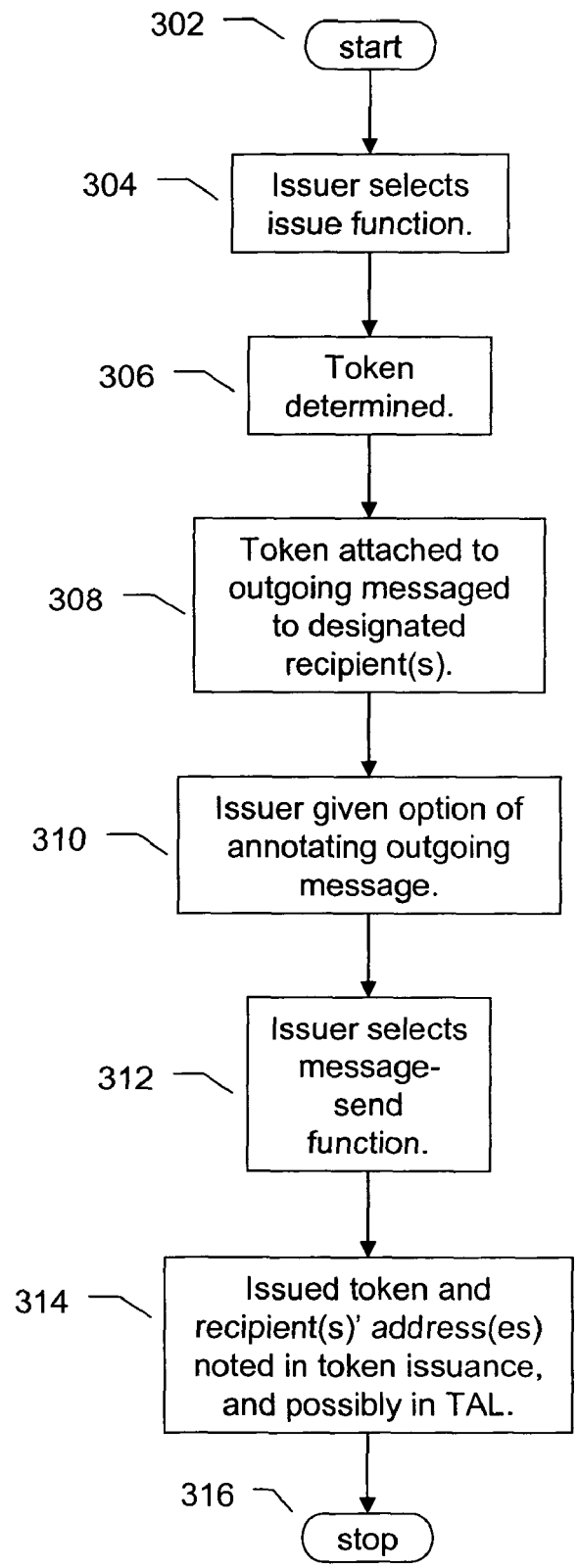
FIG. 3 is a basic flowchart of a method for issuing a token, for one embodiment of the invention.

FIG. 3 shows a basic flowchart of a method for issuing a token through automated means in one embodiment of the invention. The procedure starts 302 with the user selecting the issue function 304. Note that an alternative to the user selecting the issue function 304 would be for the system to automatically be triggered to issue a token. For example, under certain configurations the action associated with a given token might initiate the issuance of a different token.

The token to be issued is determined 306, which means that the system identifies what token is to be issued. There are a number of ways the specific token can be determined. Perhaps the most common is that the token is created as a random and arbitrary set of symbols. Alternatively, the token can be specified by the system operator, retrieved from the TL, provided to the system from a separate system, etc.

Once the token is determined 306 it is attached 308 to the outgoing message which is destined for designated recipient(s). Note that sending tokens with outgoing messages is an automated way to issue tokens, but is not the only way. An alternative is to present the token to the system operator, and let the operator manually distribute the token to potential token users (such as by listing it in a published directory or entering it on a web form). If a given token is distributed though manual means then it might be beneficial for the operator to record the token in the token issuance log with a notation about how the token is being distributed, including the communication address(es) to which the token is distributed if such is known. Such notation may prevent accidentally deleting the token at some future time due to thinking the token has never been issued.

If the automated method for issuing tokens is used, the issuer (i.e. the operator of the system issuing the token) may be given the option of annotating or modifying the outgoing message 310. For example, the issuer may want to provide some explanation or other additional comments to the recipient(s). When the issuer selects the send function 312 the message is sent to the recipient(s). When the message is sent, the token is considered to have been "issued" to the recipient(s), which is noted in the token issuance log 314 by associating the recipient(s) address(es) with the given token. Other information might also be recorded in the token issuance log, such as the date the token was issued. If the token is not already in the general token log, the system should usually also record the token in the TL so that it will be subsequently detected as a valid token. The procedure is thus complete 316, although other processing might continue such as informing the operator of the successful token issuance, etc.

One reason for keeping the token issuance log is so that the token might be reissued with subsequent messages to given recipient(s), which will be described in FIG. 5. Another reason for keeping the token issuance log is to allow checking that a received token is coming from an address to which the token was previously issued, as described in FIG. 1.

Figure 4:
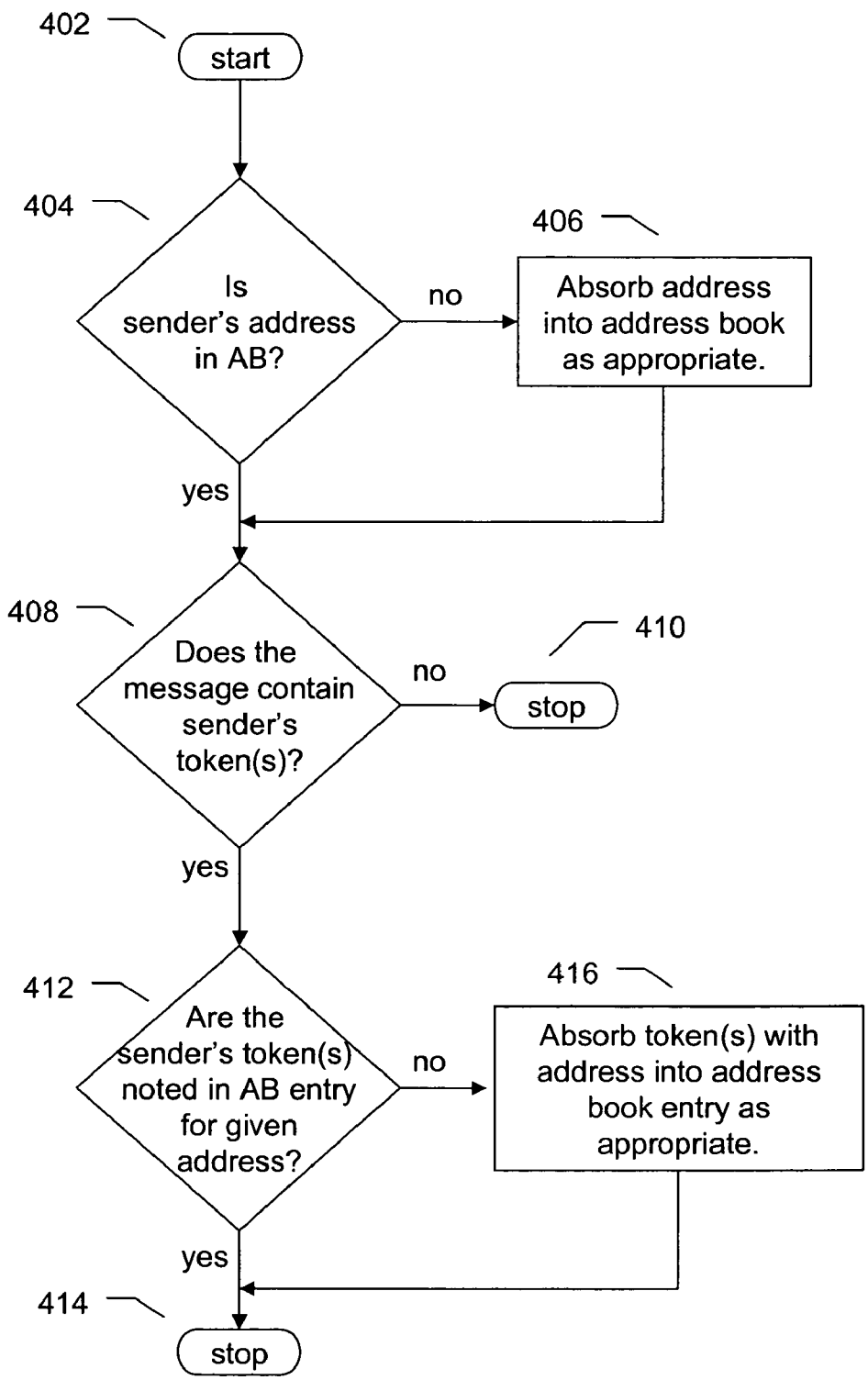
FIG. 4 is a flowchart of a method for detecting and receiving a foreign token, for one embodiment of the invention.

FIG. 4 shows a basic flowchart of a method for receiving a foreign token according to one embodiment of the invention. As mentioned previously, a "foreign token" is a token that was issued by some other individual or entity, which token is intended to be used in messages sent to that individual or entity.

The FIG. 4 procedure starts 402 when a message has been received from a given address. The procedure checks whether the sender's address is already in the system address book (AB) 404. This is important because any foreign tokens to be absorbed (i.e. stored in the system) need to be associated with specific addresses in an address book.

If the sender's address is not in the address book, then it is absorbed into the address book as appropriate 406. In some instances the system is configured for auto-absorption of addresses, which is to say that that message sender's addresses are stored in the address book without operator intervention. In other instances the operator is informed via the user interface that the sender's address is not already in the address book, and the operator has the option of either absorbing the address into the address book or not. In that scenario, it is only appropriate to absorb the address if the operator indicates such.

Next, the system checks whether the incoming message contains any tokens issued by the sender 408. This is simply to look for tokens in standard locations, an example of which is as address extensions as part of the sender's address. (In email systems, and "address extension" is a portion of the email address which annotates the address but does not otherwise change who the recipient is.)

If the incoming message does not contain any tokens issued by the sender 408, then the FIG. 4 procedure is completed 410 (although other procedures can continue such as displaying the received message on the user interface, etc.)

If the incoming message does contain any tokens issued by the sender 408, then the procedure checks 412 whether the token(s) are already noted in an address book entry for the given sender. If they are, then the FIG. 4 procedure is complete 414, although subsequent actions might happen such as recording that a previously absorbed token has be received an additional time, etc.

If the sender's token(s) are not already noted in the address book entry for the given sender then they should be absorbed into the address book 416 as appropriate. Again, if the system is configured for automatic token absorption then the tokens will be absorbed without the need for further operator confirmation. However, in other configurations the operator might be prompted first about whether or not to absorb a given token into the address book entry. Note that if it is desired to absorb a token, and if the sender's address is not already recorded in the address book, then the sender's address will need to be stored in the address book in order to store the token(s) with the address.

Figure 5:
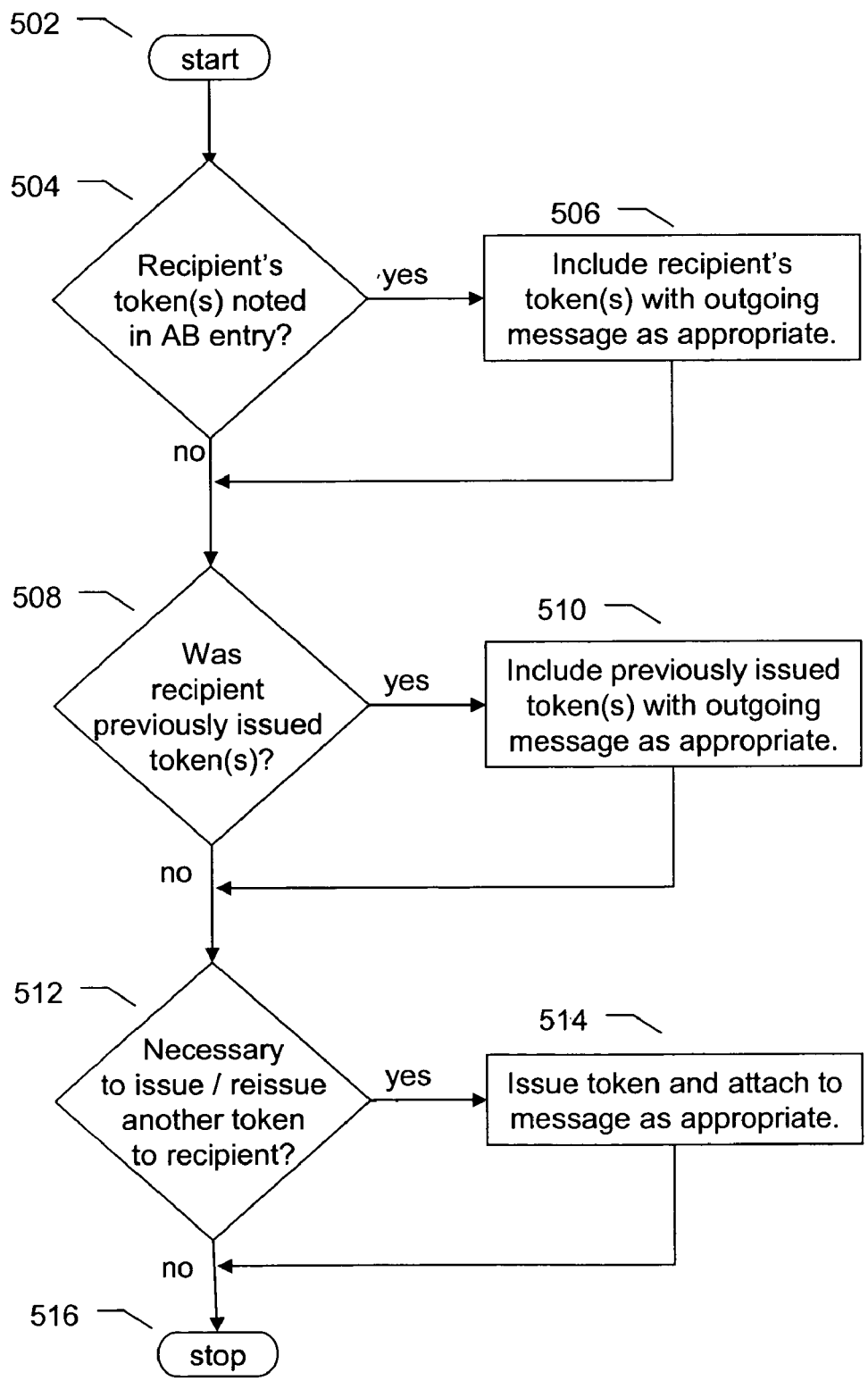
FIG. 5 is a flowchart of a method for sending a message to a recipient that may have previously issued a token to the sender, for one embodiment of the invention.

FIG. 5 shows a basic flowchart of a method for sending a message to a recipient that may have previously issued a token to the sender, according to one embodiment of the invention. Note that this is one part of an overall procedure of sending messages. Common procedure components such as allowing the system operator to compose the message, spell checking the message, etc. are not described herein since they are already in general use and assumed to be understood.

The FIG. 5 procedure starts 502 with a given message recipient having been specified. In FIG. 5 we assume that we are handling one recipient at a time. The FIG. 5 procedure will need to be repeated if there are multiple recipients, as explained in FIG. 6.

First, the system checks whether any tokens issued by the given recipient have been noted in an address book within the system 504. If so, then those token(s) would be included with the outgoing message as appropriate 506. The system might be configured to automatically include such token(s), or might be configured to prompt the system operator about whether or not to include specific token(s).

Next, the system checks whether any tokens were previously issued to the given recipient 508 as noted in a token issuance log. If so, then those token(s) would also be included with the outgoing message as appropriate 510. The system might be configured to automatically include such previously-issued token(s), or might be configured to prompt the system operator about whether or not to include specific token(s).

Finally, it may be beneficial to issue or reissue one or more other tokens to the recipient 512. For example, the system operator may indicate that if the recipient has not already been issued a token, that a token should be issued. Or, the operator may indicate that everyone involved with a certain project should be issued the same token created for that project.

If one or more other tokens 512 are issued or reissued, then those token(s) would be included with the outgoing message as appropriate 514. Again, the system might be configured to automatically issue/reissue such token(s), or might be configured to prompt the system operator about which specific token(s) to issue/reissue.

Finally, the FIG. 5 procedure stops 516, which is to say that the overall procedure for sending an outgoing message continues, including actually sending the message.

Figure 6:
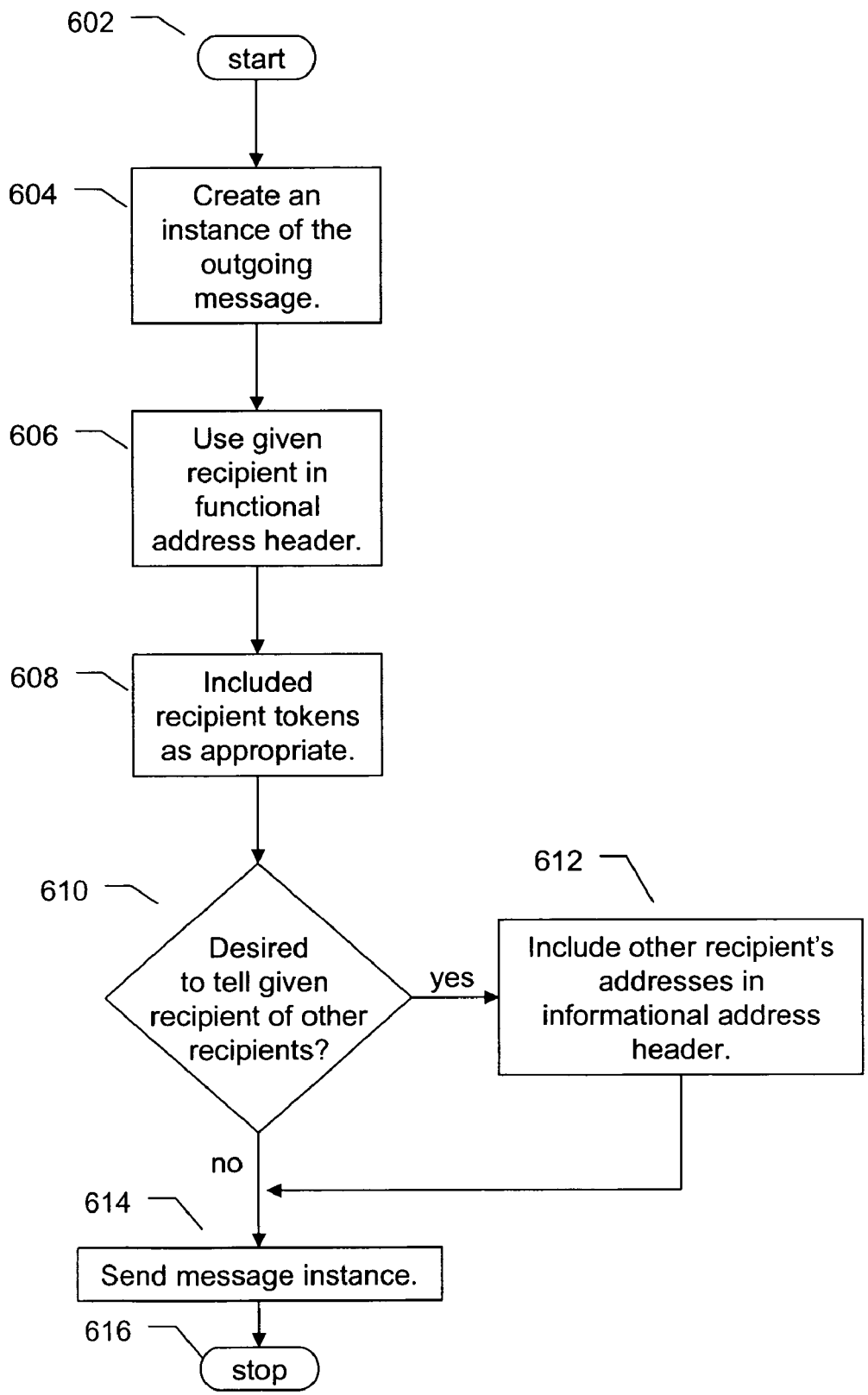
FIG. 6 is a flowchart of a method for sending a message to multiple recipients, so as to keep individual tokens private to those whom the tokens belong or are issued to, for one embodiment of the invention.

FIG. 6 shows a flowchart of a method for sending a message to multiple recipients, so as to keep individual token(s) private to those whom the token(s) belong (i.e. were issued by) or were issued to, according to one embodiment of the invention. In some instances the system operator might not care about keeping tokens private. However, in most instances keeping token(s) private will help prevent inappropriate use of token(s) by message sender(s) who should not be using others' token(s).

FIG. 6 starts 602 with a message having been created to be sent. The FIG. 6 procedure is to be repeated for each of the multiple recipients to whom the message is to be sent.

The procedure first creates an instance of the outgoing message 604 which is a copy of the message that can be configured for a given recipient. This is so that the same message can be sent to each of the recipients, but with different addressing and tokens for each of the different recipients.

The instance of the message 604 is assumed to not yet have any address headers. By "address header" we mean that portion of the message that determines routing to the message recipient(s). We define two types of address headers: functional address headers and informational address headers. "Functional address headers" are those parts of a message that actually influence how the message is routed to given recipient(s). "Informational address headers" provide information about message recipient(s) but do not actually influence the routing of a given message instance to recipient(s).

So, for the given message instance 604, the given recipient's address is included in the functional address header 606 so that the message instance can ultimately wind up being delivered to that recipient. Further, relevant tokens are included with the message instance as appropriate 608, which sub-procedure is described in FIG. 5.

It may be desired that each given message recipient be told who other intended recipients of the given message are 610. This may be configured so that it is always desired and automatic. Or it may be given as a user option for each message which is sent.

If it is desired to tell the given recipient about other intended recipients of the given message, then the addresses of those other recipients would be included in informational address headers with the message. Note that in order to maintain token privacy the tokens pertaining of those other recipient(s) are not divulged in the current message instance. Also note that some of the other recipients may not be included in the informational address headers; for example, "bcc" (blind carbon copy) recipients of email messages. Since informational messages are just informational, they might simply be included in the main body of the message rather than be listed among other functional headers of the message.

The FIG. 6 procedure concludes by sending the given message instance 614 to the given message recipient. Note that this message instance has only one recipient, which is the one included in the functional header 606. Even though the FIG. 6 procedure concludes 616 for the given recipient, the FIG. 6 procedure needs to repeat for each of the other specified recipient(s) of the given message.

Figure 7:
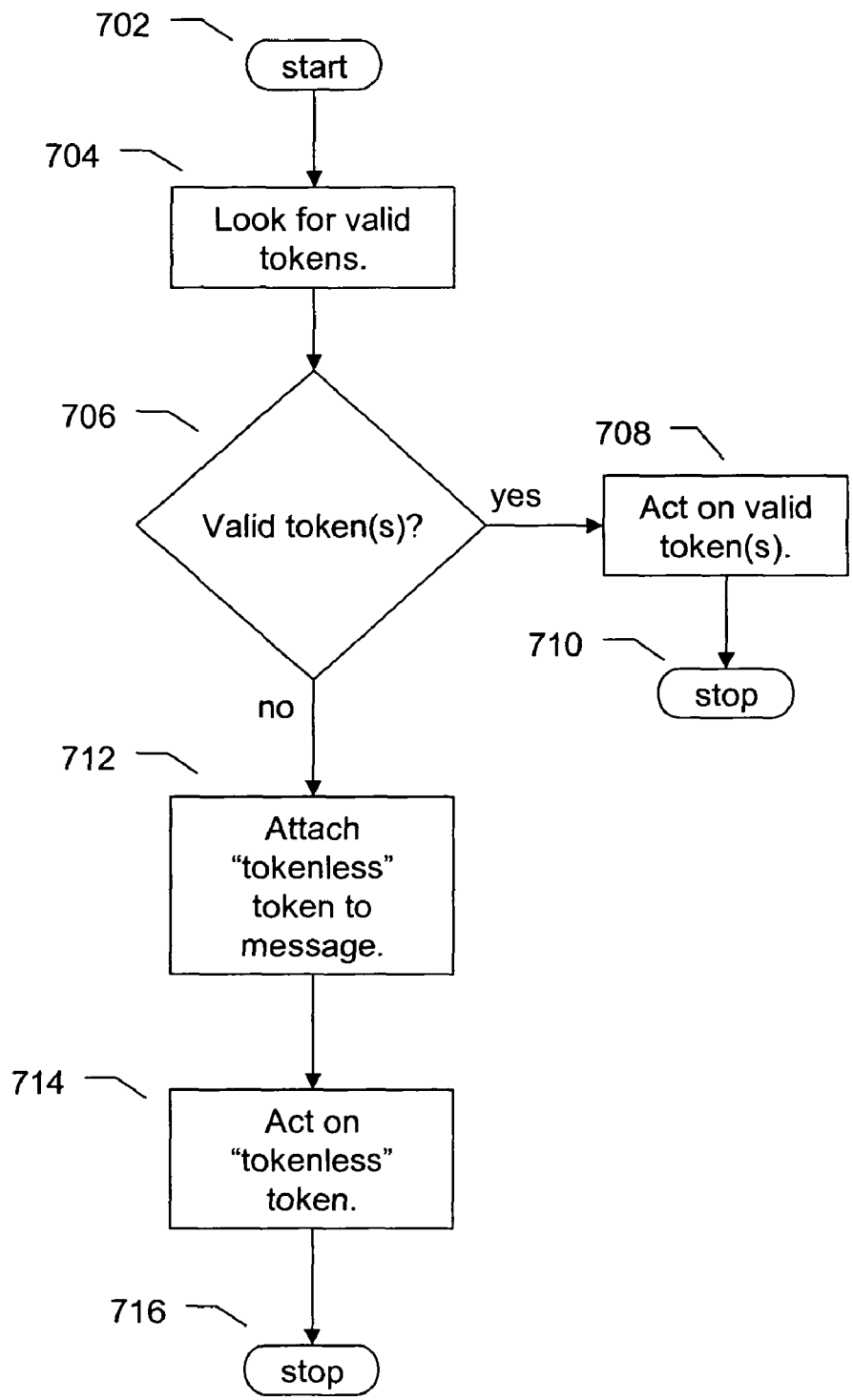
FIG. 7 is a summary flowchart of one embodiment of a method for receiving an issued token, as described in the patent applications to which this present patent application references.

FIG. 7 shows a summary flowchart of a method for receiving an issued token according to one embodiment of the invention. This procedure is described in more detail in the patent applications to which this present patent application is a continuation-in-part. It is a procedure of what has been called a "Token Log Manager" (TLM). Only a very brief description is provided herein, simply for contextual explanation.

FIG. 7 begins 702 when a message is received or when a message experiences any relevant event. Relevant events might include the message being read, the message being filed in a folder, the message being deleted, etc. The TLM checks whether the message is accompanied by valid token(s) 704, which is to say token(s) which are recorded in a TL in the system.

If there are valid token(s) with the message 706, then the TLM acts on those valid token(s) 708, which is to say that any actions pertaining to the given token(s) which are relevant to the given event are preformed. After that the FIG. 7 procedure is complete 710, and the completion might be noted in the system and/or displayed on the system user interface.

If the message does not have any valid token(s) 706, then a "tokenless" token may be attached to the message 712. The "tokenless" token has also been called the "blank" token, indicating that the given message has a blank list of valid tokens attached. The TLM then performs the actions 714 for the "tokenless" token for the given event, if any such actions have been defined, and the FIG. 7 procedure concludes 716.

Alternatively, instead of attaching a "tokenless" token 712 and acting on that "tokenless" token 714, the system could be configured to simply take specific actions on any messages without valid tokens. The use of a "tokenless" token is simply for the convenience of storing the actions in a TAL and identifying tokenless messages.

Figure 8:
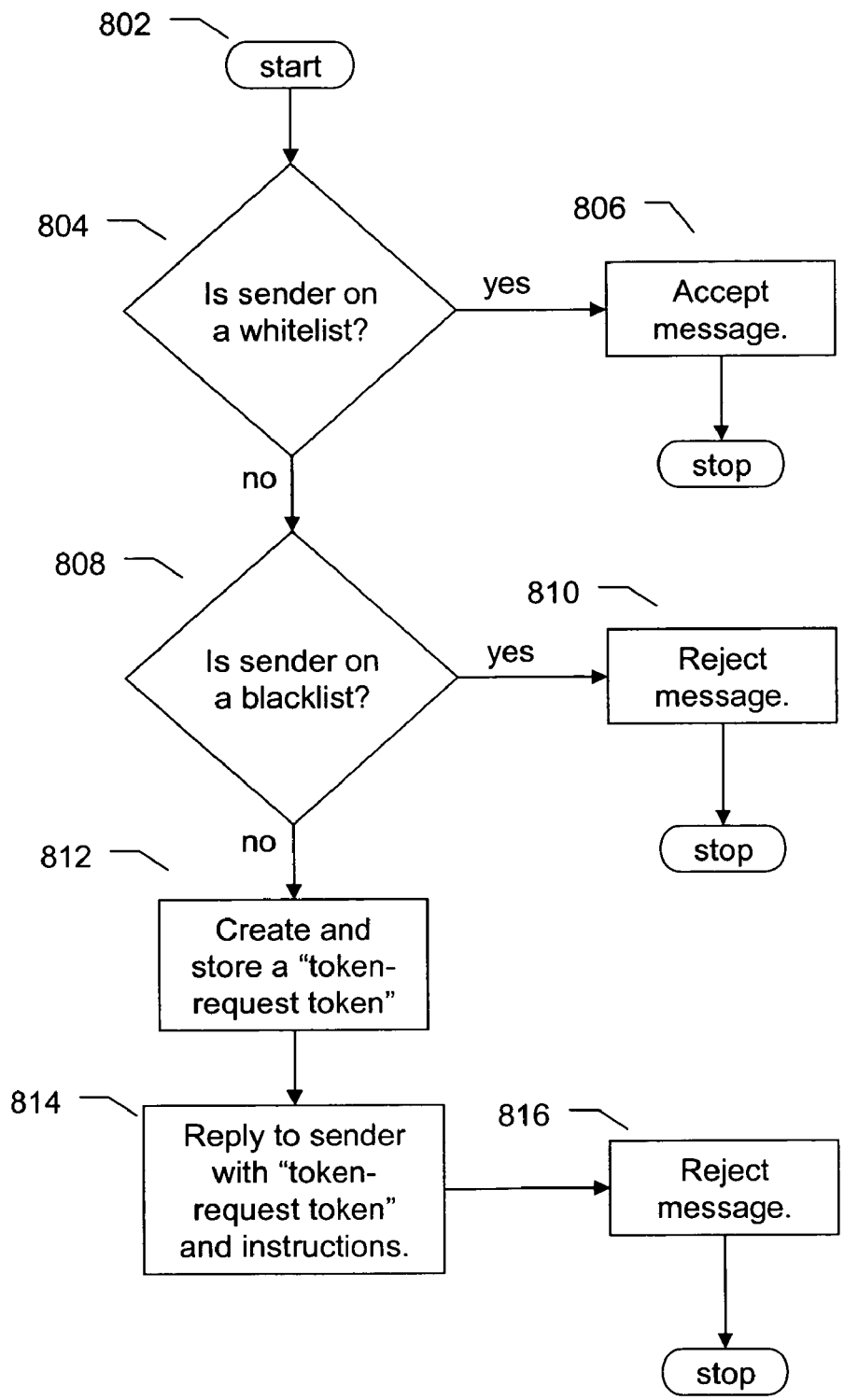
FIG. 8 is a flowchart of a method for acting on a "tokenless" token, or a message that is received without a valid token attached.

FIG. 8 give details about acting on a "tokenless" token 716 according to one embodiment of the invention. In other words, these may be the actions associated with a "tokenless" token in a TAL, or may simply be default actions for messages without a valid token.

The procedure begins 802 with an email message flagged as "tokenless," or having arrived without a valid token. A "whitelist" is traditionally a list of addresses of message senders believed to be sending desirable messages. If the sender of the message is on a whitelist 804 (such as being in the recipient's address book), then the message might be accepted 806. Nevertheless, the sender of the message might be automatically informed that it would be preferable that he or she be issued a token that could be included with future messages, thus avoiding future incidents of tokenless messages.

A "blacklist" is traditionally a list of addresses of message senders believed to be sending undesirable messages. If it is determined that the sender is on a blacklist 808, then the message could be automatically rejected 810, such as flagged as rejected, given a rejected status, placed in a trash folder, and/or deleted. One way to implement blacklists using tokens is to automatically attach a "reject" token to messages from blacklist senders. The "reject" token would have TAL actions to reject accompanying messages, as just described.

If the "tokenless" message is neither on a whitelist nor on a blacklist, then the status of the message as being acceptable or unacceptable is unknown. One way to resolve this unknown status is to create a token-request token 812 then issuing that created token to the tokenless message sender 814 with an explanation about how to use that token-request token to request a token that can be used for future messages. In one embodiment, that explanation is sent back to the sender of the "tokenless" message with from a different message account without divulging the address of the original recipient of the "tokenless" message. By including the name of the original recipient in the message, humans should be able to easily find the address, but automated message-sending "robots" would not easily identify the address. The questionable messages can be rejected 816 in some way, since the message status is unknown. In this way, unsolicited bulk messages coming from "robots" can be avoided.

The created token-request token 812 should of course be recorded in the token issuer's communication system so that appropriate actions can be taken if and when it is received. In one embodiment, the actions associated in a TAL with a token-request token may include: checking that the token-request token was received from an address to which it was issued, deleting any undesirable content with the message (such as attachments), flagging the message as being a request, and presenting the system operator with the option of issuing a token.

Note that steps 812 and 814 serve the function of providing the sender with instructions about how to request a valid token. In other embodiments this may be accomplished in other ways. For example, a reply could be sent to the sender which directs the sender to a website where he or she might be given instructions and/or means to request a token. Another example is that the reply could provide the sender with another address that he or she might contact to receive instructions and/or means for requesting a token. One advantage of such alternatives is that they can simplify the amount of information that needs to be included in the reply.

Figure 9:
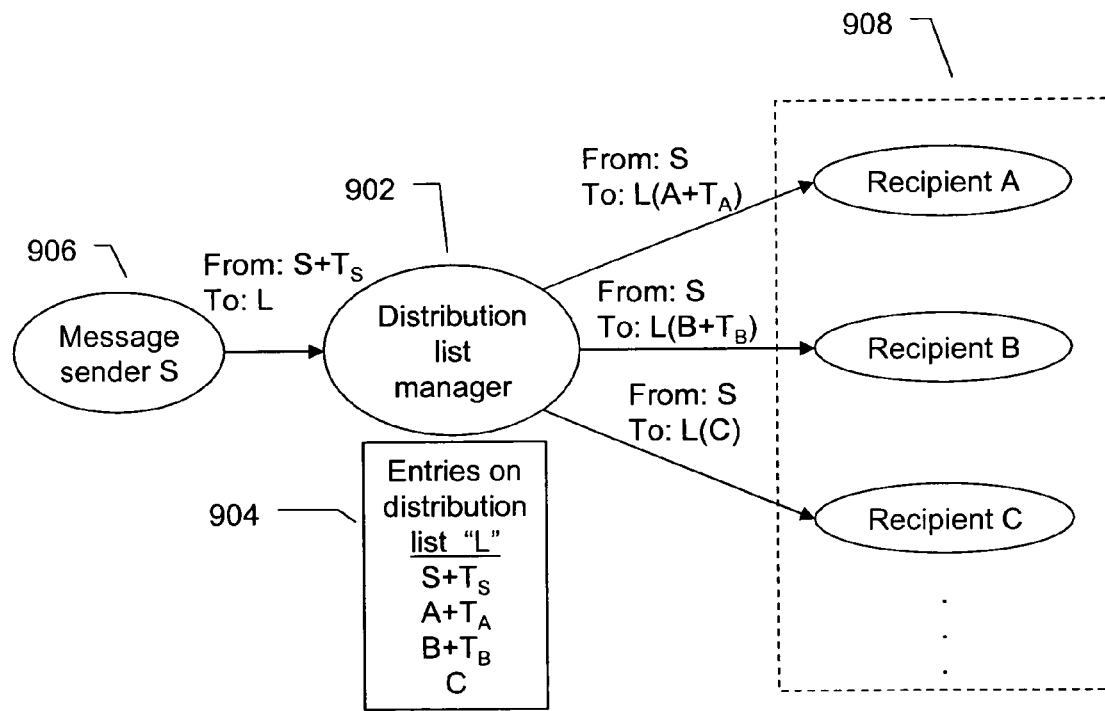
FIG. 9 is a flowchart showing one example of token-enabled message exchange using a distribution list.

FIG. 9 shows how tokens might be incorporated in a distribution list system. A distribution list manager 902 is a system that allows a message to be easily sent to all members on a given distribution list. In this example, the distribution list 904 contains four addresses, for list members S, A, B, and C. The distribution list contains not only the address of each list member, but also tokens which have been issued by each list member ($T_S$, $T_A$, and $T_B$, issued by S, A, and B respectively). Some list members may not have token log system (member C in this example), so would not have issued tokens recorded in the distribution list 904.

List member S 906 desires to send a message to all members of the distribution list 904. He or she sends the message to the distribution list manager 902, including the token $T_S$ which was issued to the list 904. One reason to include that token is to help the distribution list manager authenticate that S is a valid sender for the given list (since S's address and token are on the list). The distribution list manager 902 then sends copies of the message to each member of the list 908, including with each copy the token which was issued to the list 904 by the specific list member 908. In this way, the message will be accepted by recipients' message systems 908, since the copy of the message contains a valid issued token.

In the example shown in FIG. 9, the distribution list manager does not disclose the message sender's 906 issued token ($T_S$) to each recipient 908, but simply discloses the message sender's address (S). A recipient 908 would need to have their own token issued to them by the sender 906 in order to effectively send a message directly back to the sender. Alternatively, the sender's token ($T_S$) could be included with each copy of the message being sent to each recipient 908, thus allowing the recipients to use that token in sending a message back to the sender 906. In one embodiment, each distribution list 904 member might designate whether they want the token they issue to the list to be disclosed or not disclosed to list message recipients.

The inventor has found that it is actually quite helpful to have his list-issued token be disclosed for all messages being sent through the distribution list manager, since he has not already issued tokens to everyone on the list, and disclosing the list-issued token allows anyone on the list to send a reply to the inventor's list messages.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

The invention claimed is:

1. A method in a communication system operating on a communication device comprising:
   identifying a communication to be sent to a recipient via the communication device;
   searching a token log for one or more tokens corresponding to an identifier of the recipient;
   in response to finding no tokens which correspond to the identifier of the recipient, providing for the creation of a token as an arbitrary set of one or more symbols;
   sending the communication and the token to the recipient;
   associating the token in a token log with the identifier of the recipient;
   receiving a message that includes a second token;
   verifying that the second token is valid by locating the second token in a token log;
   processing the message based on the second token being found in the token log;
   attaching a flag to the message indicating that the message is a newly received message, which flag allows a system operator to identify which messages are newly received; and
   allowing the system operator to clear the flag.

2. The method of claim 1 wherein the identifier of the recipient comprises an address of the recipient.

3. The method of claim 1 wherein the identifier of the recipient comprises a username of the recipient.

4. A method in a communication system operating on a communication device comprising:
   providing for the creation of a token as an arbitrary set of one or more symbols;
   issuing the token to a potential user of the token;
   associating the token in a token log with an identifier of the potential user to whom the token was issued;
   identifying a communication to be sent to a recipient via the communication device;
   finding one or more tokens in the token log which correspond to the identifier of the recipient;
   sending the communication to the recipient with at least a subset of the one or more tokens which were found to correspond to the identifier of the recipient;
   receiving a message that includes a second token;
   verifying that the second token is valid by locating the second token in a token log;
   processing the message based on the second token being found in the token log;
   attaching a flag to the message indicating that the message is a newly received message, which flag allows a system operator to identify which messages are newly received; and
   allowing the system operator to clear the flag.

5. The method of claim 4 wherein the identifier of the potential user is at least one of the following: an address of the potential user, a username of the potential user, and a name of the potential user.

6. The method of claim 4 wherein the identifier of the recipient is at least one of the following: an address of the recipient, a username of the recipient, and a name of the recipient.

7. The method of claim 4 wherein the communication to be sent to a recipient is also to be sent to one or more other recipients, and sending the communication to the recipient also includes sending identifiers of the one or more other recipients.

8. The method of claim 7 wherein the identifiers of the one or more other recipients includes addresses of the one or more other recipients.

9. The method of claim 4 wherein the at least a subset of the one or more tokens is selected by the operator of the communication system.

10. The method of claim 4 wherein issuing the token to the potential user of the token comprises sending the token to the potential user of the token.

11. The method of claim 4 wherein issuing the token to the potential user of the token comprises sending the token to a system which is accessible by the potential user of the token.

12. The method of claim 4, further comprising:
   associating the token in a token log with a designated folder, wherein an incoming message accompanied by the token will automatically be stored in the designated folder.

13. The method of claim 4 wherein processing the message comprises accepting the message.

14. The method of claim 4 wherein processing the message includes changing the message account to which the message was originally received to a different message account.

15. The method of claim 4, further comprising:
associating the token with a customizable set of one or more actions in a token action log, wherein the token is to trigger the associated set of one or more actions in response to accompanying a communication that experiences an event.

16. The method of claim 15 wherein the retrieved actions include changing the message account to which the message was originally received to a different message account.

17. The method of claim 16 further comprising:
allowing a system operator to select between viewing messages for the original message account and viewing messages for the different message account.

18. The method of claim 4, further comprising:
storing the token in the one or more additional token logs.

19. The method of claim 4, wherein:
the token log is a data structure.

20. The method of claim 4, wherein the token log is an address book.

21. The method of claim 4, wherein associating the token in a token log with an identifier of the potential user to whom the token was issued comprises storing the token with an address book entry corresponding to the potential user to whom the toke was issued.

22. The method of claim 21, further comprising:
storing the token in the one or more additional address books.

23. A method in a communication system operating on a communication device comprising:
receiving a message on the communication device from a message sender, which message includes one or more tokens issued by the message sender;
associating the one or more tokens with an identifier of the message sender in a data store within the communication system;
attaching a flag to the message indicating that the message is a newly received message, which flag allows a system operator to identify which messages are newly received;
allowing the system operator to clear the flag;
identifying a communication to be sent to a recipient whose identifier is recorded in the data store within the communication system;
identifying one or more tokens associated with the recipient's identifier in the data store; and
sending the communication to the recipient with at least a subset of the one or more tokens which were found to correspond to the identifier of the recipient.

24. The method of claim 23 wherein the identifier of the message sender is at least one of the following: an address of the message sender, a username of the message sender, and a name of the message sender.

25. The method of claim 23 wherein the data store comprises an address book.

26. The method of claim 23 wherein the at least a subset of the one or more tokens is selected by the operator of the communication system.

27. The method of claim 23, wherein identifying one or more tokens associated with the recipient's identifier in the data store comprises:
identifying within the data store an alternate identifier for the recipient; and identifying one or more tokens associated with the recipient's alternate identifier in the data store.

28. A method in a communication system operating on a communication device comprising:
identifying a communication to be sent to a first recipient and to one or more other recipients via the communication device;
identifying one or more tokens associated with an identifier of the first recipient in a data store within the communication system;
sending the communication to the first recipient with identifiers of the one or more other recipients and with at least a subset of the one or more tokens which were associated with the identifier of the first recipient;
receiving a message that includes a second token;
verifying that the second token is valid by locating the second token in a token log;
processing the message based on the second token being found in the token log;
attaching a flag to the message indicating that the message is a newly received message, which flag allows a system operator to identify which messages are newly received; and
allowing the system operator to clear the flag.

29. The method of claim 28 wherein the identifier of the first recipient is at least one of the following: an address of the first recipient, a username of the first recipient, and a name of the first recipient.

30. The method of claim 28 wherein the data store comprises an address book.

31. The method of claim 28 where the identifiers of the one or other recipients include addresses of the one or more other recipients.

32. The method of claim 28 wherein the at least a subset of the one or more tokens is selected by the operator of the communication system.

33. A software system operating on a communication device comprising:
a processor commutatively coupled to a memory;
a token creation module operating on the processor to provide for the creation of one or more tokens within the communication device;
a token issuance module to issue one or more tokens to one or more potential users of the tokens;
a token issuance log stored on the memory to associate one or more tokens with one or more potential users to whom specific one or more tokens are issued;
a user interface for identifying messages to be sent to designated recipients;
a lookup module to search the token issuance log for one or more tokens associated with the designated recipients;
a message sending module for sending messages to designated recipients with at least a subset of one or more tokens which were associated with the designated recipients in the token issuance log;
a receiving module for receiving message that include tokens;
a processing module for processing received messages that include tokens;
a notification module for attaching a flag to messages that are newly received; and
allowing the system operator to clear the flag.

34. A communication apparatus comprising:
means for creating a token as an arbitrary set of one or more symbols;

means for issuing the token to a potential user of the token;
means for associating the token in a token issuance log with an identifier of the potential user to whom the token was issued;
means for identifying a communication to be sent to a recipient;
means for finding one or more tokens in the token issuance log which correspond to the identifier of the recipient;
means for sending the communication to the recipient with at least a subset of the one or more tokens which were found to correspond to the identifier of the recipient;
means for receiving message that include tokens;
means for processing received messages that include tokens; and
means for attaching a flag to messages that are newly received and allowing the system operator to clear the flag.

35. A communication apparatus comprising:
means for receiving a message from a message sender, which message includes one or more tokens issued by the message sender; and
means for associating the one or more tokens with one or more identifiers of the message sender in a data store within the communication system,
means for identifying a communication to be sent to a recipient whose identifier is recorded in the data store within the communication system;
means for identifying one or more tokens associated with the identifier of the recipient in the data store;
means for sending the communication to the recipient with at least a subset of the one or more tokens which were found to correspond to the identifier of the recipient
means for receiving message that include tokens;
means for processing received messages that include tokens; and
means for attaching a flag to messages that are newly received and allowing the system operator to clear the flag.

36. A computer program product comprising a non-transitory computer readable storage medium, the computer readable storage medium including program code for causing a computing device to perform a method comprising:
providing for the creation of a token as an arbitrary set of one or more symbols;
issuing the token to a potential user of the token;
associating the token in a token log stored in the computer readable storage non-transitory with an identifier of the potential user to whom the token was issued;
identifying a communication to be sent to a recipient;
finding one or more tokens in the token issuance log which correspond to an identifier of the recipient;
sending the communication to the recipient with at least a subset of the one or more tokens which were found to correspond to the identifier of the recipient;
receiving message that include tokens;
processing received messages that include tokens; and
attaching a flag to messages that are newly received and allowing the system operator to clear the flag.

* * * * *